US006927883B1

(12) United States Patent
Fujimoto

(10) Patent No.: US 6,927,883 B1
(45) Date of Patent: Aug. 9, 2005

(54) LIGHT-SCANNING OPTICAL APPARATUS AND IMAGE FORMING APPARATUS

(75) Inventor: Makoto Fujimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 936 days.

(21) Appl. No.: 09/631,126

(22) Filed: Aug. 2, 2000

(30) Foreign Application Priority Data

| Aug. 2, 1999 | (JP) | ............................................ | 11-218540 |
| Aug. 2, 1999 | (JP) | ............................................ | 11-218541 |
| Jul. 24, 2000 | (JP) | ........................................ | 2000-222257 |

(51) Int. Cl.[7] .................................................. H04N 1/04
(52) U.S. Cl. ........................ 358/484; 358/474; 358/481; 250/235; 359/205; 347/256
(58) Field of Search ................................. 358/481, 474, 358/484; 250/235, 216, 236; 359/205, 206, 212, 216, 217, 218, 219; 347/256, 257, 258, 259

(56) References Cited

U.S. PATENT DOCUMENTS

| 4,694,164 A | * | 9/1987 | Noguchi ..................... 250/234 |
| 4,731,623 A | * | 3/1988 | Oda et al. ................... 347/137 |
| 5,089,907 A | * | 2/1992 | Yoshikawa et al. ......... 359/206 |
| 5,247,385 A | * | 9/1993 | Takanashi .................... 359/205 |
| 5,557,446 A | * | 9/1996 | Kato ........................... 359/206 |
| 5,694,236 A | | 12/1997 | Sekikawa .................... 359/206 |

FOREIGN PATENT DOCUMENTS

JP        9-96773        4/1997        ........... G02B/26/10

* cited by examiner

Primary Examiner—Edward Coles
Assistant Examiner—Heather D. Gibbs
(74) Attorney, Agent, or Firm—Fitzpatrick, Cella, Harper & Scinto

(57) ABSTRACT

A high definition light-scanning optical apparatus uses an oblique incidence optical system and has a simple configuration that does not exert any adverse effect on the quality of the image formed by it as the elements of the apparatus are appropriately arranged. The light-scanning optical apparatus comprises an incidence optical system adapted to cause the light beam emitted from an incident light emitting light source including a fold mirror to strike a deflection plane of an optical deflector with a predetermined angle in the sub-scanning section and a focussing optical system for focussing the light beam reflected by the deflection plane of the optical deflector on a surface to be scanned. The focussing optical system includes an fθ lens system having a spherical lens and a first cylindrical lens showing power in the main-scanning direction and a second cylindrical lens showing power in the sub-scanning direction.

35 Claims, 11 Drawing Sheets fθ CHARACTERISTIC

LIGHT-SCANNING OPTICAL APPARATUS AND IMAGE FORMING APPARATUS

BACKGROUND OF THE INVENTION

1. Field of the Invention

This invention relates to a light-scanning optical apparatus and, more particularly, it relates to a light-scanning optical apparatus adapted to cause a light beam emitted from a light source to strike a deflection plane of an optical deflector with a predetermined angle of incidence in a plane intersecting the optical axis along the sub-scanning direction (hereinafter referred to as sub-scanning section) and the light beam deflected/reflected by the optical deflector to scan a surface to be scanned. A light-scanning optical apparatus according to the invention can suitably be used for an image-forming apparatus such as a laser beam printer or digital copying machine.

2. Related Background Art

Conventional oblique incidence optical systems adapted to cause a light beam emitted from a light source to strike a deflection plane of an optical deflector with a predetermined angle of incidence in the sub-scanning section typically comprise as the focussing optical system (fθ lens system) a cylindrical lens having power of converging the light beam only in the main-scanning direction as proposed in Japanese Patent Application Laid-Open No. 9-96773.

Additionally, such systems typically employ a cylindrical mirror having power of converging the light beam only in the sub-scanning direction as the tilt correcting operation system for correcting the tilt of the reflection plane of the optical deflector.

FIG. 12 of the accompanying drawings is a schematic perspective view of a principal portion of a light-scanning optical apparatus proposed in the above patent document.

Referring to FIG. 12, the light beam emitted from a semiconductor laser 41 is transformed into a slightly divergent light beam by a condenser lens 42 and limited by an aperture stop 43 before entering a cylindrical lens 44 of incidence system having power of converging the light beam only in the sub-scanning direction. The slightly divergent light beam entering the cylindrical lens 44 is converged in the sub-scanning direction and then enters second and first cylindrical lenses 46 and 47 of an fθ lens system 53 having power of converging the light beam only in the main-scanning direction by way of a fold mirror 45 to become focussed and form a linear image (extending in the main-scanning direction) near the deflection plane 48a. Note that the light beam strikes the deflection plane 48a with a predetermined angle relative to a plane perpendicular to the axis of rotation of the optical deflector 48 (plane of rotation of the optical deflector 48) in the sub-scanning section that contains the axis of rotation of the optical deflector 48 and the optical axis of the focussing optical system 52.

On the other hand, the light beam is transmitted through the second and first cylindrical lenses 46 and 47 of the fθ lens system 53 without being modified (and hence as slightly divergent light beam) in a plane intersecting the optical axis in the main-scanning direction (hereinafter referred to as main-scanning section).

The light beam deflected/reflected by the deflection plane 48a of the optical deflector 48 is then led to the surface of a photosensitive drum 50 that is a surface to be scanned by ways of the first and second cylindrical lenses 47 and 46 and a cylindrical mirror 49 having power of converging the light beam only in the sub-scanning direction so that it scans the surface of the photosensitive drum 50 in the direction of arrow B (main-scanning direction) as the optical deflector 48 is driven to rotate in the sense of arrow A. As a result, an image is recorded on the surface of the photosensitive drum 50 operating as recording medium.

Note that, in FIG. 12, both the lens surface 47a of the first cylindrical lens 47 facing the surface of the photosensitive drum 50 and the lens surface 46a of the second cylindrical lens 46 facing the optical deflector 48 are planes.

In recent years, there has been a strong demand for scanning optical systems adapted to scan the surface to be scanned 50 at high speed. While the demand may be met by increasing the number of deflection planes 48a of the polygon mirror 48 without using a large polygon mirror 48, each of the deflection plane of a polygon mirror 48 having such a large number of deflection planes 48a inevitably shows a small area and a small deflection angle. Thus, such a polygon mirror is accompanied by the problem of a narrow scanning width on the surface to be scanned 50 when the light beam shows a width smaller than the facet width of the deflection plane 48a. Then, the entire surface of the deflection plane 48a has to be utilized to deflect/reflect the light beam emitted from the light source which is typically a semiconductor laser 41. This requirement of using the entire surface of the deflection plane 48a is met by using an overfilled system where the width of the light beam is sufficiently larger than the facet width of the deflection plane 48a.

However, the overfilled system has a problem that the intensity of the light beam coming from the deflection plane 48a can vary as a function of the deflection angle of the deflection plane 48a. To alleviate this problem, the light beam emitted from the semiconductor laser 41 is required to squarely strike the optical deflector 48 by using an arrangement of causing the light beam to pass through the fθ lens system 53, which is part of the incidence system, both when striking the optical deflector 48 and when coming back from the optical deflector 48 (double pass arrangement) and/or causing the light beam emitted from the light source 1 to strike the deflection plane 48a substantially from the center of the deflection angle of the optical deflector 48 (front incidence arrangement). Then, it is practically impossible to make the fθ lens system 53 or the light-scanning optical apparatus show a flat profile. As a result, an image forming apparatus comprising such an fθ lens system and a light-scanning optical apparatus will not only be costly but also bulky.

Additionally, the use of a double pass arrangement gives rise to a problem of wavefront aberration due to the fact that the light beam passes through the fθ lens system 53 twice.

To avoid the above problems and realize a compact light-scanning optical apparatus, the one shown in FIG. 12 (Japanese Patent Application Laid-Open No. 9-96773) is so arranged as to make the fθ lens system 53 not to have power in the sub-scanning direction and the light beam passing therethrough to advance without being refracted in the sub-scanning direction, while the light source 41 is arranged at a position close to the optical axis of the fθ lens system 53 to make the image forming apparatus a very flat one. Then, the wavefront aberration is reduced in the sub-scanning direction.

However, the above described known light-scanning optical apparatus is accompanied by the following problems that have to be dissolved.

(1) The first and second cylindrical lenses 47 and 46 are costly relative to spherical lenses. Particularly, the surface facing the optical deflector 48 of the first cylindrical lens 47 is required to have a large curvature to make it difficult to prepare and costly.

(2) An optical system using a cylindrical mirror 49 does not provide any choice in terms of the fold angle of the cylindrical mirror 49. Once designed, the fold angle becomes invariable and both the cylindrical mirror 49 and the fθ lens system 53 have to be redesigned to modify the fold angle.

(3) As the light beam enters the first and second cylindrical lenses 47 and 46, part of the light beam trying to enter either of the lenses is reflected by the surface thereof to get to a central part of the image and adversely affect the image quality.

SUMMARY OF THE INVENTION

Therefore, it is the object of the present invention to provide a high definition light-scanning optical apparatus using an oblique incidence optical system and having a simple configuration that does not exert any adverse effect on the quality of the image to be formed by arranging the elements of the apparatus appropriately.

In the first aspect of the present invention, the above object is achieved by providing a light-scanning optical apparatus comprising:

an incidence optical system adapted to cause a light beam emitted from a light source to strike a deflection plane of an optical deflector with a predetermined angle in the sub-scanning section; and a focussing optical system for focussing the light beam reflected by the deflection plane of the optical deflector on a surface to be scanned;

said focussing optical system including an fθ lens system having a spherical lens and a first cylindrical lens showing power in the main-scanning direction and an optical system showing power in the sub-scanning direction;

said spherical lens and said-first cylindrical lens also constituting part of said incidence optical system.

In the second aspect of the present invention, there is provided a light-scanning optical apparatus comprising:

an incidence optical system adapted to cause a light beam emitted from a light source to strike a deflection plane of an optical deflector with a predetermined angle in the sub-scanning section; and a focussing optical system for focussing the light beam reflected by the deflection plane of the optical deflector on a surface to be scanned;

said focussing optical system including an fθ lens system having a spherical lens and a first cylindrical lens showing power in the main-scanning direction and an optical system showing power in the sub-scanning direction;

said focussing optical system satisfying the requirements of conditional formulas (1) and (2) below:

$$\left|\frac{(N1-1)}{R2} \cdot F\right| < 0.15 \quad (1)$$

and $$\left|\frac{(N2-1)}{R3} \cdot F\right| < 0.15, \quad (2)$$

where

F: the focal length of the fθ lens system in the main-scanning direction,

R2: the radius of curvature of the surface of the spherical lens facing the surface to be scanned, R3: the radius of curvature of the surface of the first cylindrical lens facing the optical deflector as viewed in the main-scanning direction, N1: the refractive index of the material of the spherical lens at the operating wavelength and N2: the refractive index of the material of the first cylindrical lens at the operating wavelength.

In the third aspect of the present invention, there is provided a light-scanning optical apparatus comprising:

an incidence optical system adapted to cause a light beam emitted from a light source to strike a deflection plane of an optical deflector with a predetermined angle in the sub-scanning section; and a focussing optical system for focussing the light beam reflected by the deflection plane of the optical deflector on a surface to be scanned;

said focussing optical system including an fθ lens system having a spherical lens and a first cylindrical lens showing power in the main-scanning direction and an optical system showing power in the sub-scanning direction;

the light beam emitted from the light source being made to strike the deflection plane of said optical deflector with a width broader than that of the deflection plane in the main-scanning direction.

In the fourth aspect of the present invention, there is provided a light-scanning optical apparatus comprising:

an incidence optical system adapted to cause a light beam emitted from a light source to strike a deflection plane of an optical deflector with a predetermined angle in the sub-scanning section; and a focussing optical system for focussing the light beam reflected by the deflection plane of the optical deflector on a surface to be scanned;

said focussing optical system including an fθ lens system having a lens showing power both in the main-scanning direction and in the sub-scanning direction and a first cylindrical lens showing power in the main-scanning direction and an optical system showing power in the sub-scanning direction;

said lens showing power both in the main-scanning direction and in the sub-scanning direction and said first cylindrical lens also constituting part of said incidence optical system.

In the fifth aspect of the present invention, there is provided a light-scanning optical apparatus comprising:

an incidence optical system adapted to cause a light beam emitted from a light source to strike a deflection plane of an optical deflector with a predetermined angle in the sub-scanning section; and a focussing optical system for focussing the light beam reflected by the deflection plane of the optical deflector on a surface to be scanned;

said focussing optical system including an fθ lens system having a lens showing power both in the main-scanning direction and in the sub-scanning direction and a first cylindrical lens showing power in the main-scanning direction and an optical system showing power in the sub-scanning direction;

the light beam emitted from the light source being made to strike the deflection plane of said optical deflector with a width broader than that of the deflection plane in the main-scanning direction.

The lens showing power both in the main-scanning direction and in the sub-scanning direction as defined above according to the fourth and fifth aspects of the invention is only required to perform well in terms of the field curvature, the spot diameter and the fθ characteristic of the light beam on the surface to be scanned and hence may be less costly than the first cylindrical lens 47 of the known light-scanning optical apparatus shown in FIG. 12. Such a lens can be processed with ease to achieve a desired curvature for the lens surface.

Therefore, the use of a spherical lens showing power both in the main-scanning direction and in the sub-scanning direction is most preferable when the reduced cost and the easiness of processing the lens surface are taken into consideration.

DESCRIPTION OF THE PREFERRED EMBODIMENTS

[Embodiment 1]

Figure 1:
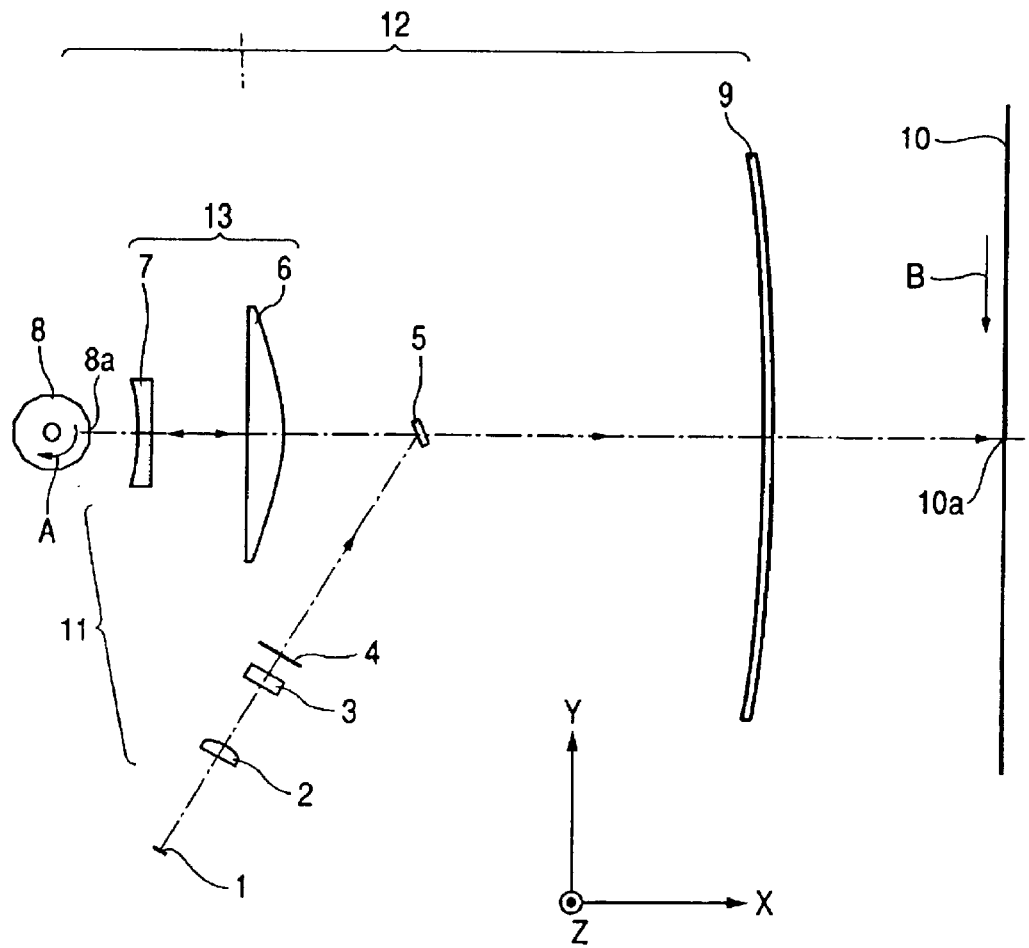
FIG. 1 is a schematic plan view of a principal portion of Embodiment 1 of the present invention.
Figure 2:
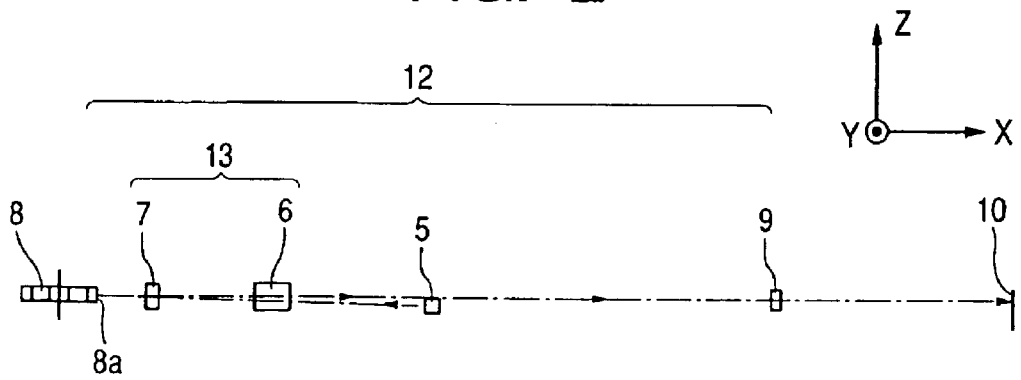
FIG. 2 is a schematic lateral view of a principal portion of Embodiment 1 of the present invention.

FIG. 1 is a schematic plan view of a principal portion of Embodiment 1 of the present invention, showing the elements thereof as projected onto the main-scanning section. FIG. 2 is a schematic lateral view of a principal portion of Embodiment 1, showing the elements thereof as projected onto the sub-scanning section.

An x-, y- and z-coordinate system as shown in FIG. 1 is defined for the purpose of the specification of this patent application, where the x-axis agrees with the optical axis of the incidence optical system while the y-axis agrees with the main-scanning direction when the optical path is developed. Thus, the main-scanning section is defined as x-y section while the sub-scanning section is defined as x-z section.

Referring to FIG. 1, there are shown a light source 1 typically comprising a semiconductor laser, a condenser lens (collimator lens) 2 for transforming the light beam emitted from the light source 1 into a slightly divergent light beam, a cylindrical lens 3 of the incidence system showing positive refractive power only in the sub-scanning direction and adapted to focus the light beam coming out of the condenser lens 2 on the deflection plane (reflection plane) 8a of optical deflector 8, which will be described hereinafter, to form a substantially linear image in the sub-scanning section, an aperture stop 4 for controlling the light beam passing therethrough so as to trim it and a fold mirror 5 for folding back the light beam coming from the aperture stop 4 toward the optical deflector 8.

Note that the condenser lens 2, the cylindrical lens 3, the aperture stop 4 and the fold mirror 5 constitute the incidence optical system 11 along with some other elements. Additionally, a collimator system is formed in the main-scanning section by three lenses including the condenser lens 2, a first cylindrical lens 6 and a spherical lens 7, which will be described hereinafter.

In FIG. 1, reference numeral 8 denotes an optical deflector that typically comprises a (rotary) polygon mirror adapted to be driven to rotate at a constant rate in the sense of arrow A in FIG. 1 by a drive means (not shown) such as an electric motor. The polygon so mirror 8 has twelve surface planes whose-inscribed circle shows a half diameter of 14 mm.

Reference numeral 12 denotes a focussing optical system that includes an fθ lens system 13 having a spherical lens 7 and a first cylindrical lens 6 showing positive power in the main-scanning direction and a second cylindrical lens 9 showing predetermined power in the sub-scanning direction so that it focusses the deflected light beam from the optical deflector 8 on a surface to be scanned 10 and establishes a conjugate relationship between the deflection plane 8a of the optical deflector 8 and the surface to be scanned 10 in the sub-scanning section in order to correct any tilt of the deflection plane 8a. Note that the fθ lens system 13 also operates as part of the incidence optical system 11. The surface to be scanned 10 is the surface of a photosensitive drum.

With the embodiment having the above described configuration, the light beam optically modulated and emitted from the semiconductor laser 1 is transformed into a slightly divergent light beam by the condenser lens 2 and then enters the cylindrical lens 3 of the incidence system. The slightly divergent light beam entering the cylindrical 3 is converged by it in the sub-scanning section, limited by the aperture stop 4 and transmitted through the first cylindrical lens 6 and the spherical lens 7 by way of the fold mirror 5 before striking the deflection plane 8a of the optical deflector 8 to become focussed and form a substantially linear image (extending in the main-scanning direction) near the deflection plane 8a. Note that the light beam strikes the deflection plane 8a with an angle of 0.8° relative to a plane perpendicular to the axis of rotation of the optical deflector 8 (plane of rotation of the optical deflector) in the sub-scanning section that contains the axis of rotation of the optical deflector 8 and the optical axis of the focussing optical system 12. In other words, the light beam from the incidence optical system 11 strikes the deflection plane 8a aslant in the sub-scanning section (oblique incidence system).

On the other hand, in the main-scanning section, the light beam is transmitted through the first cylindrical lens 6 and the spherical lens 7 as a slightly divergent state and transformed into a substantially collimated light beam before striking the deflection plane 8a of the optical deflector 8 along the center line of the deflection angle (front incidence). Note that the substantially collimated light beam shows a width that is sufficiently broad relative to the facet width of the deflection plane 8a of the optical deflector 8 in the main-scanning direction (overfilled optical system).

The light beam deflected/reflected by the deflection plane 8a of the optical deflector 8 is then led to the surface of the photosensitive drum 10 by way of the spherical lens 7, the first cylindrical lens 6 and the second cylindrical lens 9 to scan the surface of the photosensitive drum 10 in the sense of arrow B (in the main-scanning direction) as the optical deflector 8 is driven to rotate in the sense of arrow A. As a result, an image is recorded on the surface of the photosensitive drum 10 operating as recording medium.

The light beam scans the surface to be scanned 10 highly accurately with a small spot diameter when the requirements of conditional formulas of (1) through (3) below are satisfied:

$$\left| \frac{(N1-1)}{R2} \cdot F \right| < 0.15, \tag{1}$$

$$\left| \frac{(N2-1)}{R3} \cdot F \right| < 0.15 \tag{2}$$

and $$0.86 < N1/N2 < 0.92 \tag{3},$$

where

F: the focal length of the fθ lens system in the main-scanning direction,

R2: the radius of curvature of the surface of the spherical lens facing the surface to be scanned, R3: the radius of curvature of the surface of the first cylindrical lens facing the optical deflector as viewed in the main-scanning direction, N1: the refractive index of the material of the spherical lens at the operating wavelength and N2: the refractive index of the material of the first cylindrical lens at the operating wavelength.

Now, the technological meaning of the conditional formulas (1) through (3) above will be discussed below.

The conditional formulas (1) and (2) should hold true when the lens surface of the spherical lens 7 facing the surface to be scanned 10 and the lens surface of the first cylindrical lens 6 facing the optical deflector 8 are made to be plane or show a small curvature in order to adapt themselves to the oblique incidence optical system. If the requirement of one or both of the conditional formulas (1) and (2) is not met, the wavefront aberration increases in the direction of 45° to undesiredly deform the light spot. In short, the wavefront aberration is prevented from being aggravated in this embodiment by satisfying the requirements of the conditional formulas (1) and (2).

The conditional formula (3) provides the requirement to be met for suppressing the cost of the material of the system and, at the same time, simplifying the configuration of the fθ lens system 13. In other words, if the requirement of the conditional formula (3) is not met, the cost of the material of the system rises and the configuration of the fθ lens system 13 becomes complex.

In order to correct the aberration for the purpose of the invention, preferably at least one of the following requirements of (a-1) through (a-5) is met.

(a-1)

$$0.05 < D0/F < 0.08 \tag{4},$$

where

D0: the distance between the deflection plane 8a of the optical deflector 8 and the spherical lens 7.

(a-2)

$$0.15 < \frac{(D1/N1 + D2 + D3/N2)}{F} < 0.20, \tag{5}$$

where

D1: the thickness of the spherical lens 7,

D2: the distance between the spherical lens 7 and the first cylindrical lens 6 and D3: the thickness of the first cylindrical lens.

(a-3)

The spherical lens 7 and the first cylindrical lens 6 constitute part of the incidence optical system (a-4)

The light beam emitted from the light source 1 strikes the deflection plane 8a of the optical deflector 8 substantially along the center line of the deflection angle of the optical deflector 8.

(a-5)

The light beam emitted from the light source 1 strikes the deflection plane 8a of the optical deflector 8 with a width broader than that of the deflection plane 8a in the main-scanning direction.

The conditional formulas (4) and (5) above provide the requirements to be met when the lens surface of the spherical lens 7 facing the surface to be scanned 10 and the lens surface of the first cylindrical lens 6 facing the optical deflector 8 are made to be plane or show a small curvature and, at the same time, the field curvature is corrected satisfactorily in the main-scanning direction. In other words, if the requirement of one or both of the conditional formulas (4) and (5) is not met, it may be difficult to satisfactorily correct the field curvature in the main-scanning direction.

Figure 3:
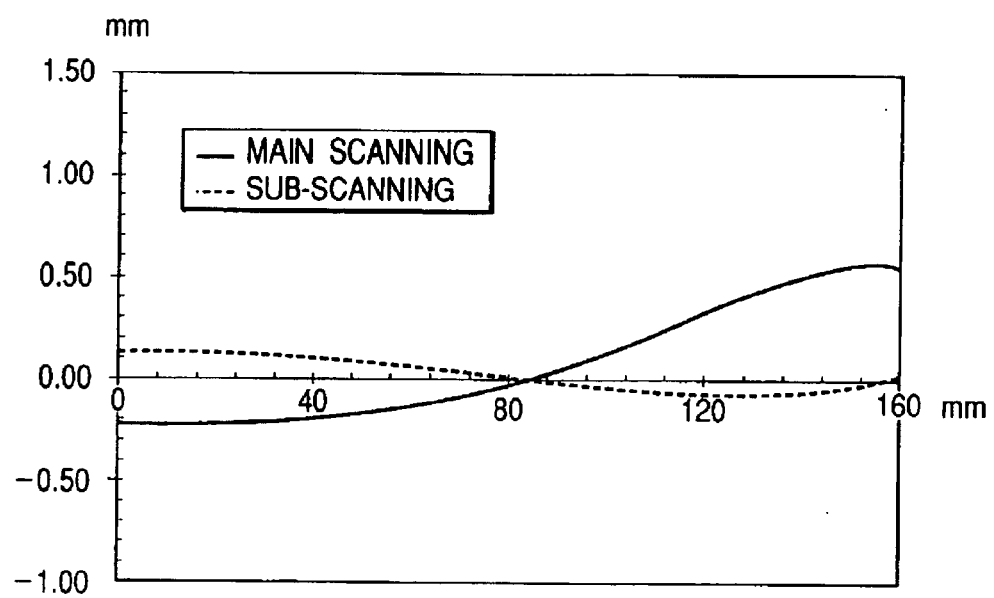
FIG. 3 is a graph showing the field curvature of Embodiment 1 in the main-scanning direction and in the sub-scanning direction.
Figure 4:
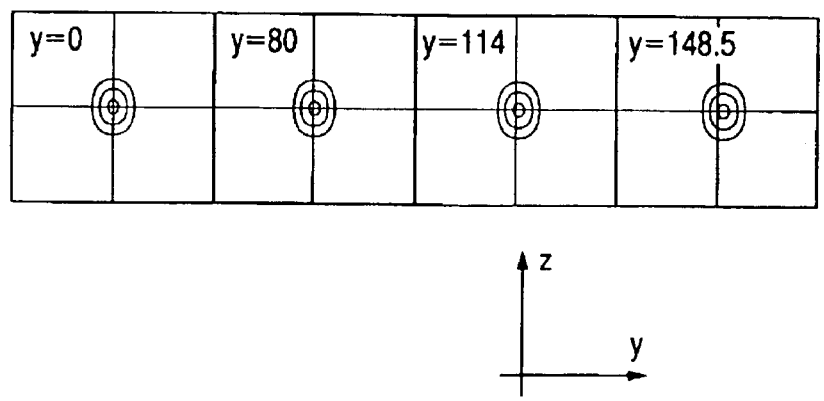
FIG. 4 is a graph showing the spot profile of Embodiment 1 of the present invention.
Figure 5:
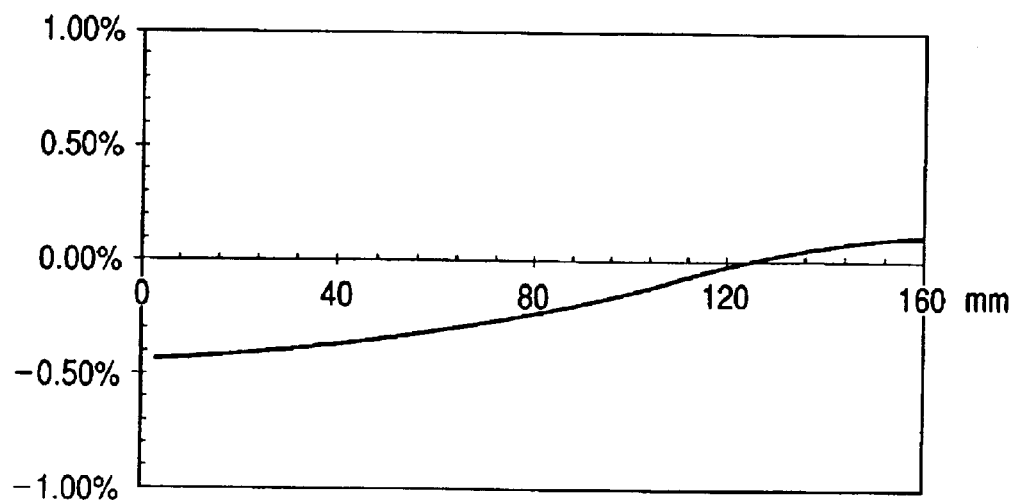
FIG. 5 is a graph showing the fθ characteristic of Embodiment 1 of the present invention.

FIG. 3 is a graph showing the field curvature of Embodiment 1 in the main-scanning direction and in the sub-scanning direction. FIG. 4 is a graph showing the spot profiles of Embodiment 1 of the present invention at different image heights. It will be appreciated that the contour lines of the spot profiles of FIG. 4 represent 13.5%, 40% and 80% respectively relative to the normalized peak, while the spot diameters are about 45 μm in the main-scanning direction (y-direction) and about 65 μm in the sub-scanning direction (z-direction). FIG. 5 is a graph showing the fθ characteristic of Embodiment 1 that varies as a function of the image height.

As shown in FIGS. 3, 4 and 5, the field curvature of this embodiment is corrected satisfactorily both in the main-scanning direction and in the sub-scanning direction, while both the spot profile and the fθ characteristic are also satisfactory.

[Embodiment 2]

Figure 6:
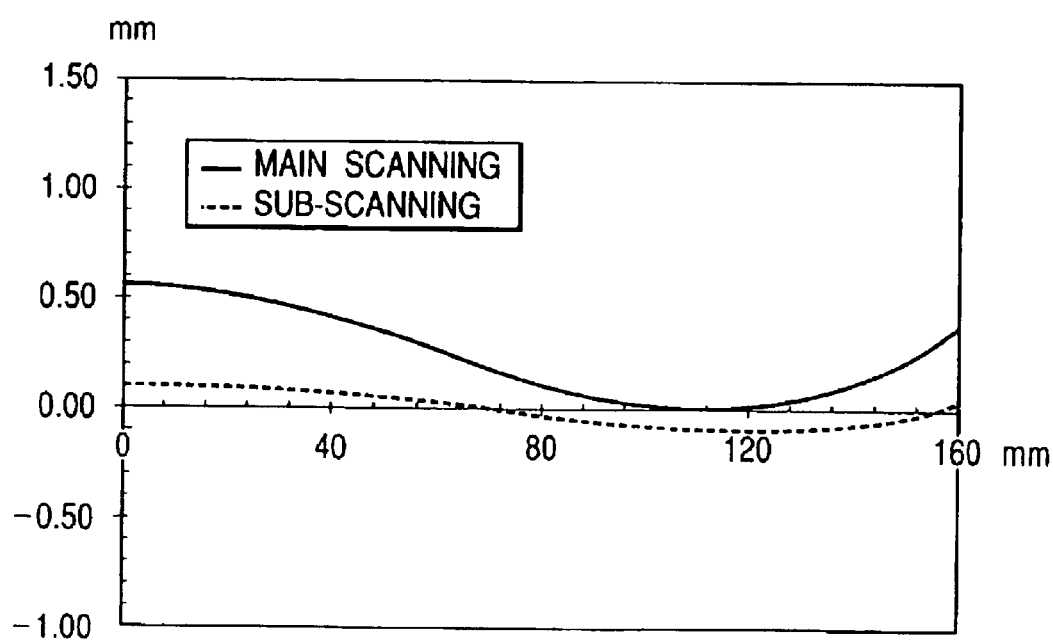
FIG. 6 is a graph showing the field curvature of Embodiment 2 in the main-scanning direction and in the sub-scanning direction.
Figure 7:
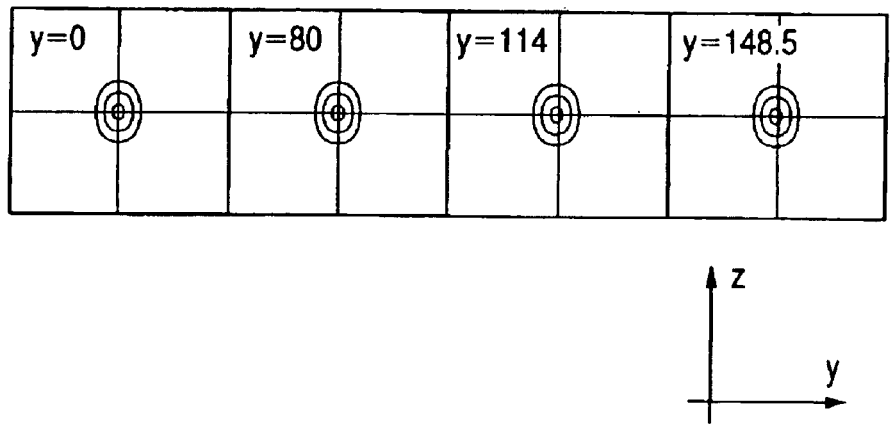
FIG. 7 is a graph showing the spot profile of Embodiment 2 of the present invention.
Figure 8:
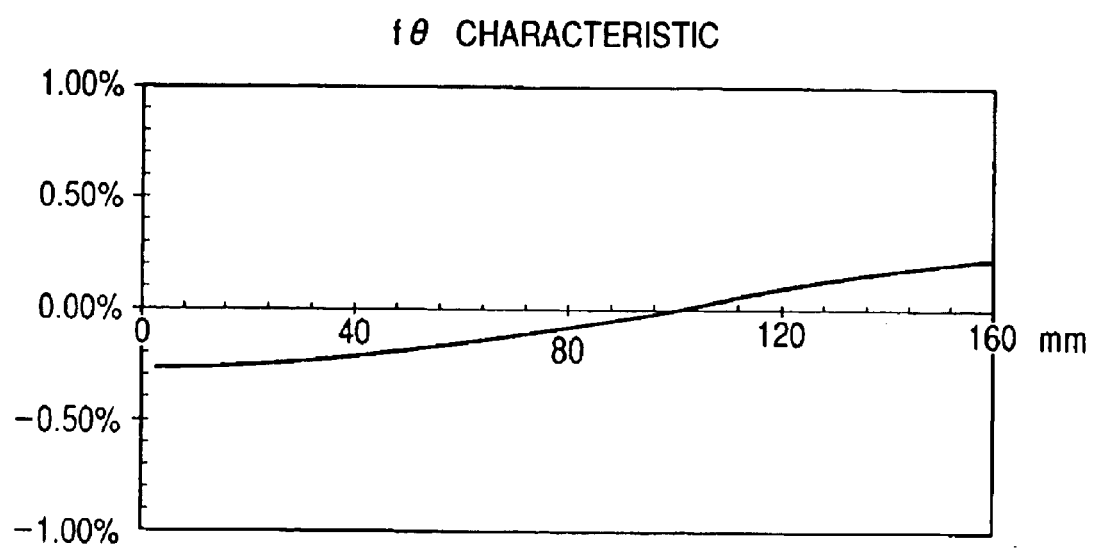
FIG. 8 is a graph showing the fθ characteristic of Embodiment 2 of the present invention.

FIG. 6 is a graph showing the field curvature of Embodiment 2 in the main-scanning direction and in the sub-scanning direction. FIG. 7 is a graph showing the spot profiles of Embodiment 2 of the present invention at different image heights. It will be appreciated that the contour lines of the spot profiles of FIG. 7 represent 13.5%, 40% and 80% respectively relative to the normalized peak, while the spot diameters are about 45 μm in the main-scanning direction (y-direction) and about 65 μm in the sub-scanning direction (z-direction). FIG. 8 is a graph showing the fθ characteristic of Embodiment 2 that varies as a function of the image height.

This embodiment differs from the above described Embodiment 1 in terms of the profiles and the, intervals of arrangement of the lenses of the focussing optical system. Otherwise, this embodiment is identical with Embodiment 1 particularly in terms of configuration and optical effect.

As shown in FIGS. 6, 7 and 8, the field curvature of this embodiment is corrected satisfactorily both in the main-scanning direction and in the sub-scanning direction, while both the spot profile and the fθ characteristic are also satisfactory.

[Embodiment 3]

Figure 9:
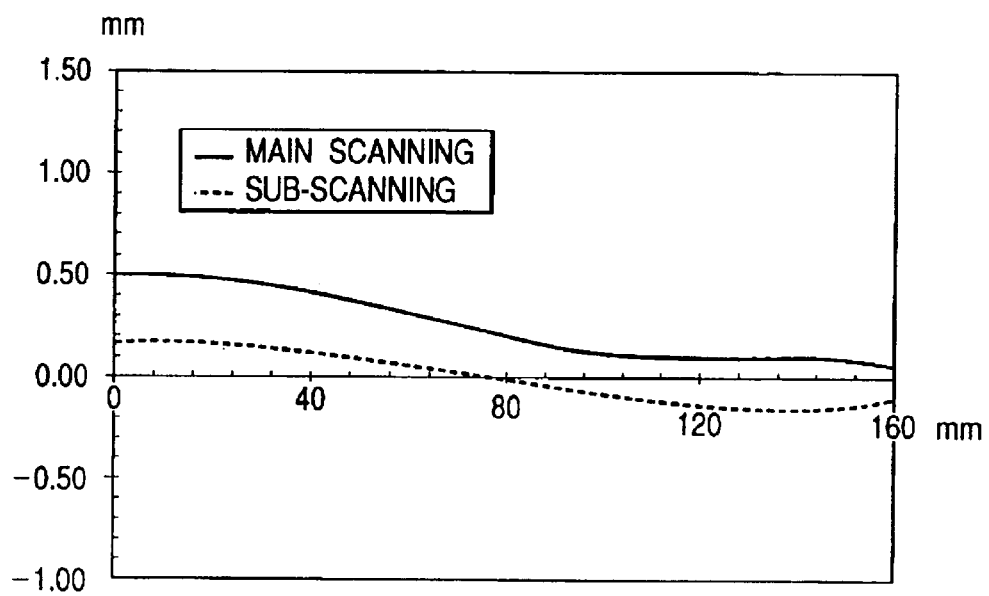
FIG. 9 is a graph showing the field curvature of Embodiment 3 in the main-scanning direction and in the sub-scanning direction.
Figure 10:
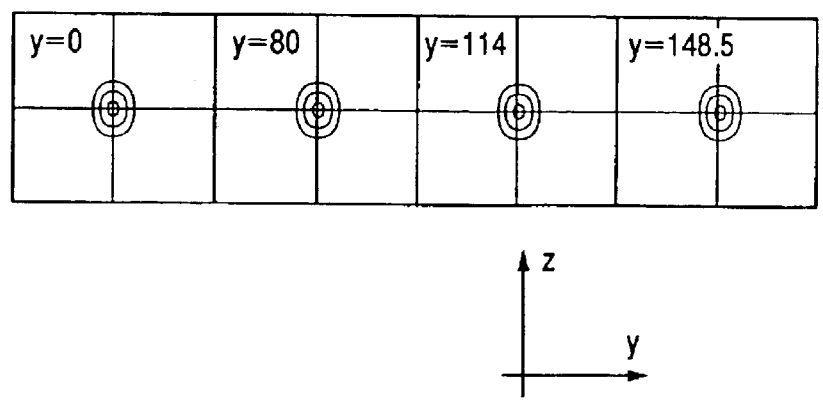
FIG. 10 is a graph showing the spot profile of Embodiment 3 of the present invention.
Figure 11:
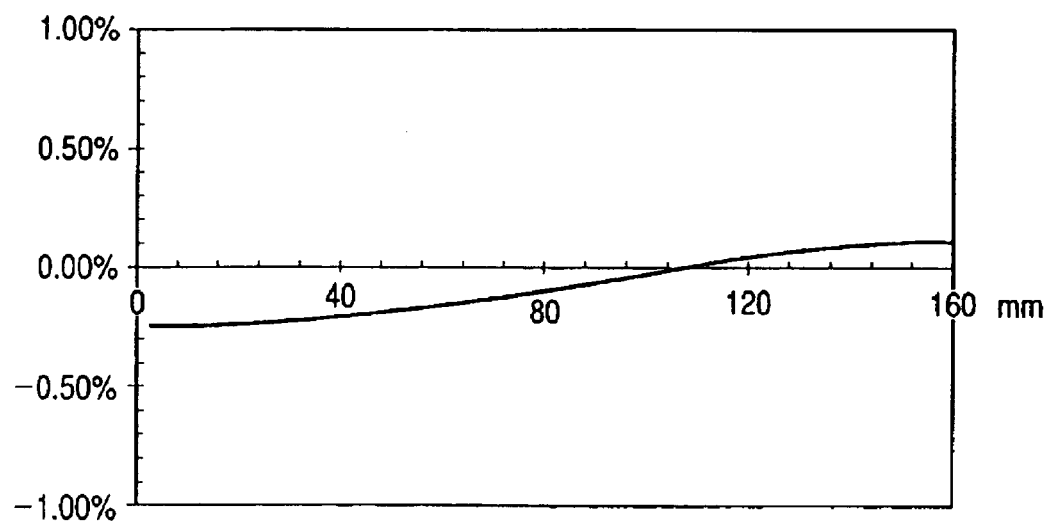
FIG. 11 is a graph showing the fθ characteristic of Embodiment 3 of the present invention.
Figure 12:
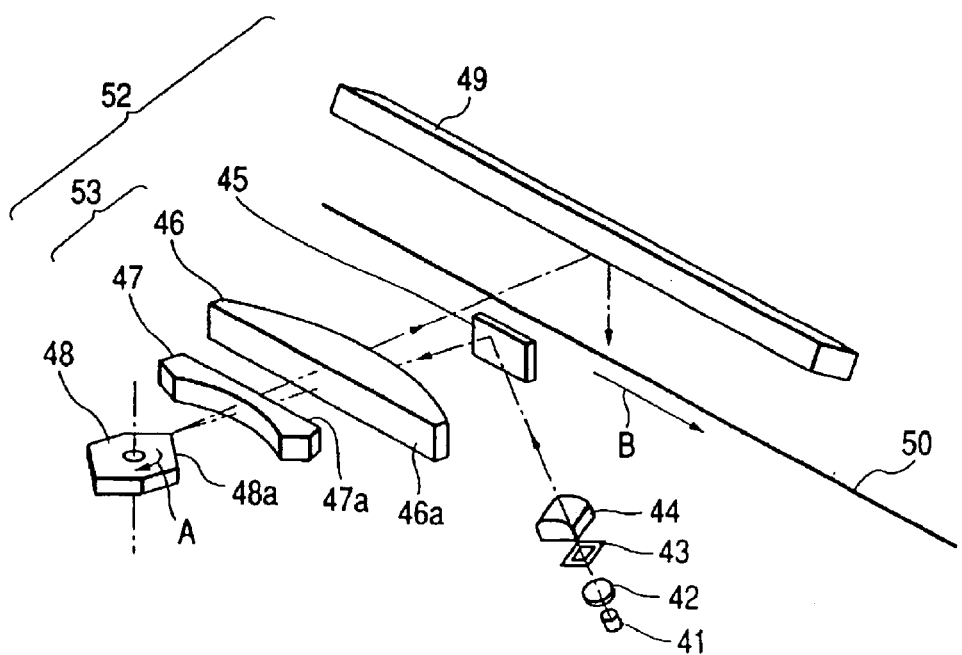
FIG. 12 is a schematic perspective view of a principal portion of known optical scanning apparatus.

FIG. 9 is a graph showing the field curvature of Embodiment 3 in the main-scanning direction and in the sub-scanning direction. FIG. 10 is a graph showing the spot profiles of Embodiment 3 of the present Invention at different image heights. It will be appreciated that the contour lines of the spot profiles of FIG. 10 represent 13.5%, 40% and 80% respectively relative to the normalized peak, while the spot diameters are about 45 μm in the main-scanning direction (y-direction) and about 65 μm in the sub-scanning direction (z-direction). FIG. 11 is a graph showing the fθ characteristic of Embodiment 3 that varies as a function of the image height.

This embodiment differs from the above described Embodiment 1 in terms of the profiles and the intervals of arrangement of the lenses of the focussing optical system. Otherwise, this embodiment is identical with Embodiment 1 particularly in terms of configuration and optical effect.

As shown in FIGS. 9, 10 and 11, the field curvature of this embodiment is corrected satisfactorily both in the main-scanning direction and in the sub-scanning direction, while both the spot profile and the fθ characteristic are also satisfactory.

According to the invention, the left side of the conditional formula (2) applicable to the oblique incidence optical system preferably shows a value not greater than that of the left side of the conditional formula (1) or $$\left| \frac{(N2-1)}{R3} \cdot F \right| \leq \left| \frac{(N1-1)}{R2} \cdot F \right|$$

in order to reduce the wavefront aberration, improve the spot profile and reduce the field curvature.

More preferably, the left side of the conditional formula (2) applicable to the oblique incidence optical system shows a value smaller than that of the left side of the conditional formula (1) or $$\left| \frac{(N2-1)}{R3} \cdot F \right| < \left| \frac{(N1-1)}{R2} \cdot F \right|.$$

The semiconductor laser 1 operating as light source according to the invention is not limited to a single beam laser having a unique light beam emitting port. Alternatively, it may be a multi-beam laser having a plurality of (e.g., two, three, four, . . . ) light beam emitting ports.

The optical system showing power in the sub-scanning direction preferably comprises a second cylindrical lens 9 showing power in the sub-scanning direction as a matter of convenience in optical design, but it is not restricted thereto. A cylindrical mirror showing power in the sub-scanning direction is also usable.

The present invention-provides an advantage of securing a large scanning width on the surface to be scanned 10 because it uses an overfilled optical system.

Additionally, since the overfilled optical system is of the double pass type that uses the fθ lens system 13 so as to make it operate also for the incidence optical system, the present invention provides another advantage of reducing the variance in the intensity of the light beam coming from the deflection plane 8a that arises as a function of the deflection angle of the deflection plane 8a.

Still additionally, since the fθ lens system 13 includes a spherical lens 7 and a first cylindrical lens 6 showing power in the main-scanning direction and hence the light source 1 can be arranged near the optical axis of the fθ lens system 13, the present invention provides still another advantage of realizing a very flat light-scanning optical apparatus.

Finally, since the first cylindrical lens 6 shows no power in the sub-scanning direction, the present invention provides still another advantage of preventing the light beam that passes through the first cylindrical lens 6 twice from shifting its light path in the sub-scanning direction, although the overfilled optical system is of the double pass type that uses the fθ lens system 13 so as to make it operate also for the incidence optical system.

Now, an image forming apparatus realized by applying the present invention will be described by referring to FIG. 20 of the accompanying drawings.

Figure 20:
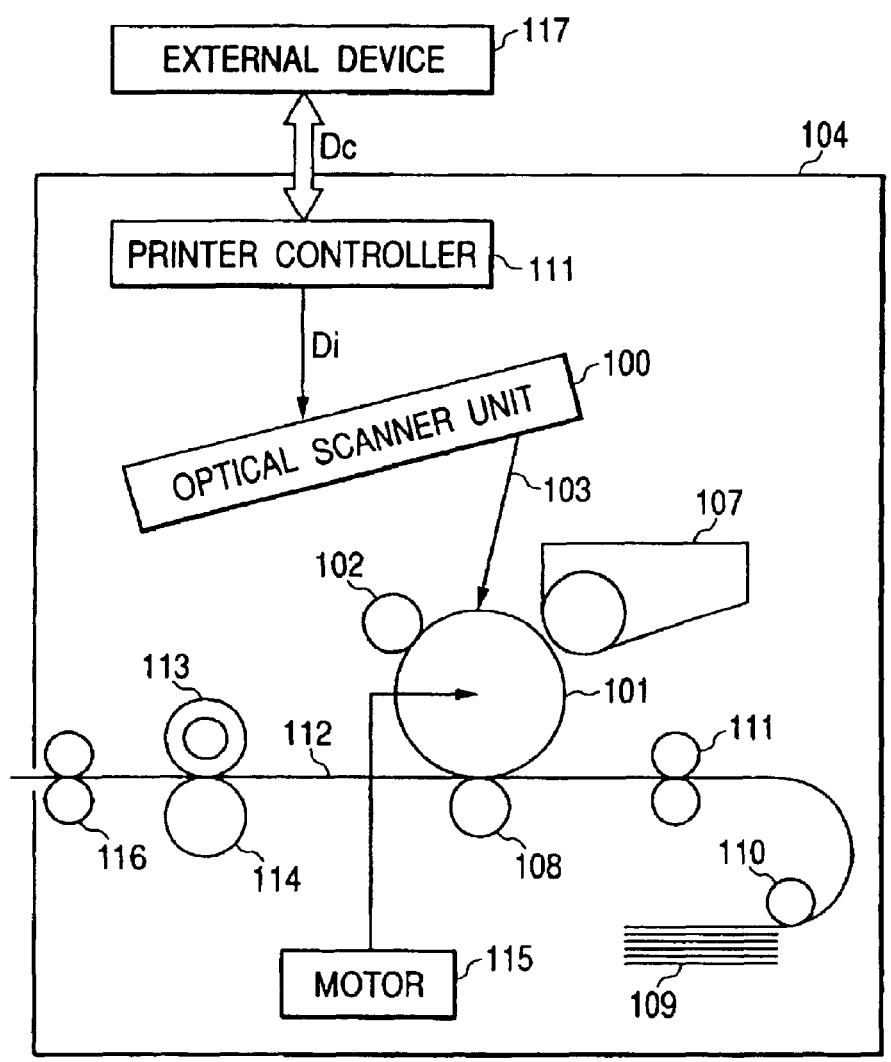
FIG. 20 is a schematic block diagram of an image forming apparatus according to the invention.

FIG. 20 is a schematic cross sectional view of a principal portion of a preferred embodiment of image forming apparatus according to the invention taken along the sub-scanning direction. Referring to FIG. 20, reference symbol 104 denotes an image forming apparatus, which is adapted to receive code data Dc from an external device 117 that may be a personal computer. The code data Dc is converted into an image data (dot data) Di by printer controller 111 arranged within the apparatus. The image data Di is then input to optical scanning unit 100, which optical scanning unit 100 then emits a light beam 103 that is modulated according to the image data Di and made to scan the photosensitive surface of photosensitive drum 101 in the main-scanning direction.

The photosensitive drum 101 operating as electrostatic latent image carrier (photosensitive member) is driven to rotate clockwise by motor 115. As the photosensitive drum 101 rotates, the photosensitive surface of the drum 101 moves relative to the light beam 103 in the sub-scanning direction that is perpendicular to the main-scanning direction. An electrifying roller 102 is disposed above and held in touch with the photosensitive drum 101 in order to electrifying the surface of the photosensitive drum 101. Then, the light beam 103 is irradiated onto the surface of the photosensitive drum 101 that is electrified by the electrifying roller 102 and made to scan the surface by said optical scanning unit 100.

As pointed out above, the light beam 103 is modulated according to the image data Di so that an electrostatic latent image is formed on the surface of the photosensitive drum 101 as the surface is irradiated with the light beam 103. The electrostatic latent image is developed to a toner image by developing unit 107 that is located downstream relative to the light spot formed by the light beam 103 on the surface of the photosensitive drum 101 and held in touch with the surface.

The toner image developed by the developing unit 107 is then transferred onto a sheet of paper 112, which is also referred to as image receiving member, by transfer roller 108 arranged downstream and vis-a-vis relative to the photosensitive drum 101. While the sheet of paper 112 is supplied from a paper cassette 109 arranged in front of the photosensitive drum 101 (rightward relative to the drum in FIG. 20), it may alternatively be fed by hand. The paper cassette 109 is provided at an end thereof with a paper feed roller 110, which actually takes the part of feeding the sheet of paper 112 to the sheet conveying path by way of register roller 111.

Then, the sheet of paper 112 now carrying an unfixed toner image is conveyed to a fixing unit arranged behind the photosensitive drum 101 (leftward relative to the drum in FIG. 20). The fixing unit comprises a fixing roller 113 containing a fixing heater in the inside (not shown) and a pressure roller 114 arranged so as to be pressed against the fixing roller 113. The unfixed toner image on the sheet of paper 112 conveyed from the transfer unit is fixed as the sheet of paper 112 is heated by the heater while it is held under pressure between the pressure areas of the fixing roller 113 and the pressure roller 114. A delivery unit is arranged behind the fixing roller 113 and the sheet of paper 112 now carrying the fixed image is delivered to the outside of the image forming apparatus.

While not shown in FIG. 20, the printer controller 111 not only operates for data conversion in a manner as described above but also controls the components of the image forming apparatus and the polygon motor arranged in the optical scanning unit as will be discussed hereinafter.

Now, Examples 1 through 3 of set of numerical values that can be used for the focussing optical systems of Embodiments 1 through 3 will be shown below.

Note that the following symbols are used in the following examples.

N1: the refractive index of the material of the spherical lens 7 at the operating wavelength, N2: the refractive index of the material of the first cylindrical lens 6 at the operating wavelength, D0: the distance between the deflection plane 8$a$ of the optical deflector 8 and the spherical lens 7, D1: the thickness of the spherical lens 7, D2: the distance between the spherical lens 7 and the first cylindrical lens 6, D3: the thickness of the first cylindrical lens 6.

D4: the distance between the first cylindrical lens 6 and the second cylindrical lens 9, D5: the thickness of the second cylindrical lens 9, D6: the distance between the second cylindrical lens 9 and the surface to be scanned 10, R1: the radius of curvature of the surface of the spherical lens 7 facing the optical deflector 8, R2: the radius of curvature of the surface of the spherical lens 7 facing the surface to be scanned 10, R3: the radius of curvature of the surface of the first cylindrical lens 6 facing the optical deflector 8 as viewed in the main-scanning direction, R4: the radius of curvature of the surface of the first cylindrical lens 6 facing the surface to be scanned 10 as viewed in the main-scanning direction, r3: the radius of curvature of the surface of the second cylindrical lens 9 facing the optical deflector 8 as viewed in the sub-scanning direction, rd3: the aspherical coefficient of the surface of the second cylindrical lens 9 facing the optical deflector 8 as viewed in the sub-scanning direction, r4: the radius of curvature of the surface of the second cylindrical lens 9 facing the surface to be scanned 10 as viewed in the sub-scanning direction, rd4: the aspherical coefficient of the surface of the second cylindrical lens 9 facing the surface to be scanned 10 as viewed in the sub-scanning direction, where the radius of curvature r' for the distance y from the longitudinal axis on the surface of the second cylindrical lens 9 as viewed in the sub-scanning direction being expressed by $r3' = r3 \cdot (1 + rd3 \cdot y^2)$ and $r4' = r4 \cdot (1 + rd4 \cdot y^2)$, and r5: the radius of curvature of the surfaces of the second cylindrical lens 9 facing the optical, deflector 8 and facing the surface to be scanned 10 as viewed in the main-scanning direction.

Table 1 shows the relationship between the above conditional formulas and the numerical values in the examples of sets of numerical values as listed below.

Note that the numerical values not accompanied by any unit in the following examples are expressed on the basis of unit of millimeter.

EXAMPLE 1

Set of Numerical Values
Operating Wavelength=655 nm

| F = 343 | |
| --- | --- |
| N1 = 1.51389 | R1 = −263.3 |
| N2 = 1.6667 | R2 = 2098.45606 |
| D0 = 25 | R3 = ∞ |
| D1 = 4 | R4 = −145.5 |
| D2 = 41.45 | r3 = 114.1 |
| D3 = 15 | rd3 = 6.634 × 10$^{-6}$ |
| D4 = 214 | r4 = −109.8 |
| D5 = 4 | rd4 = 7.914 × 10$^{-6}$ |
| D6 = 168 | r5 = −1000 |

EXAMPLE 2

Set of Numerical Values
Operating Wavelength=655 nm

| F = 344 | |
| --- | --- |
| N1 = 1.51389 | R1 = −489.84 |
| N2 = 1.6667 | R2 = 1413.3 |
| D0 = 25 | R3 = ∞ |
| D1 = 4 | R4 = −167.8 |
| D2 = 50.9 | r3 = 114.1 |
| D3 = 15 | rd3 = 6.634 × 10$^{-6}$ |
| D4 = 204.6 | r4 = −109.8 |

-continued

F = 344

| | |
|---|---|
| D5 = 4 | rd4 = 7.914 × 10⁻⁶ |
| D6 = 168 | r5 = −1000 |

EXAMPLE 3

Set of Numerical Values
Operating Wavelength=655 nm

F = 344.5

| | |
|---|---|
| N1 = 1.51389 | R1 = −271.43 |
| N2 = 1.73165 | R2 = 1773.5 |
| D0 = 25 | R3 = ∞ |
| D1 = 4 | R4 = −160.4 |
| D2 = 41.5 | r3 = 114.1 |
| D3 = 15 | rd3 = 6.634 × 10⁻⁶ |
| D4 = 214 | r4 = −109.8 |
| D5 = 4 | rd4 = 7.914 × 10⁻⁶ |
| D6 = 168 | r5 = −1000 |

TABLE 1

| | Numerical Values | | |
|---|---|---|---|
| Conditional Formulas | 1 | 2 | 3 |
| (1)\|(N1 − 1)/R2 · F\| | 0.08 | 0.13 | 0.10 |
| (2)\|(N2 − 1)/R3 · F\| | 0 | 0 | 0 |
| (3) N1/N2 | 0.91 | 0.91 | 0.87 |
| (4) D0/F | 0.073 | 0.073 | 0.073 |
| (5)(D1/N1 + D2 + D3/N2)/F | 0.155 | 0.182 | 0.153 |

[Embodiment 4]

FIG. 1 is a schematic plan view of a principal portion of Embodiment 4 of the present invention, showing the elements thereof as projected onto the main-scanning section. FIG. 2 is a schematic lateral view of a principal portion of Embodiment 4, showing the elements thereof as projected onto the sub-scanning section.

An x-, y- and z-coordinate system as shown in FIG. 1 is defined for the purpose of the specification of this patent application, where the x-axis agrees with the optical axis of the incidence optical system while the y-axis agrees with the main-scanning direction when the optical path is developed. Thus, the main-scanning section is defined as x-y section while the sub-scanning section is defined as x-z section.

Referring to FIG. 1, there are shown a light source 1 typically comprising a semiconductor laser, a condenser lens (collimator lens) 2 for transforming the light beam emitted from the light source 1 into a slightly divergent light beam, a cylindrical lens 3 of the incidence system showing positive refractive power only in the sub-scanning direction and adapted to focus the light beam coming out of the condenser lens 2 on the deflection plane (reflection plane) 8a of optical deflector 8, which will be described hereinafter, to form a substantially linear image in the sub-scanning section, an aperture stop 4 for controlling the light beam passing therethrough so as to trim it and a fold mirror 5 for folding back the light beam coming from the aperture stop 4 toward the optical deflector 8.

Note that the condenser lens 2, the cylindrical lens 3, the aperture stop 4 and the fold mirror 5 constitute the incidence optical system 11 along with some other elements.

Additionally, in the main-scanning section, a collimator system is formed by three lenses including the condenser lens 2, a first cylindrical lens 6 and a spherical lens 7, which will be described hereinafter.

In FIG. 1, reference numeral 8 denotes an optical deflector that typically comprises a (rotary) polygon mirror adapted to be driven to rotate at a constant rate in the sense of arrow A in FIG. 1 by a drive means (not shown) such as an electric motor. The polygon mirror 8 has twelve surface planes whose inscribed circle shows a half diameter of 14 mm.

Reference numeral 12 denotes a focussing optical system that includes an fθ lens system 13 having a spherical lens 7 and a first cylindrical lens showing positive power in the main-scanning direction and a second cylindrical lens 9 showing predetermined power in the sub-scanning direction so that it focusses the deflected light beam from the optical deflector 8 on a surface to be scanned 10 and establishes a conjugate relationship between the deflection plane 8a of the optical deflector and the surface to be scanned 10 in the sub-scanning section in order to correct any tilt of the deflection plane 8a. In this embodiment, the light beam La at image height=0 (light beam passing the center of scanning 10a in the main-scanning section) shall pass through a position off the optical axis of the second cylindrical lens 9 (lines connecting the centers of curvature of the two cylindrical lenses in the sub-scanning section containing the center of scanning) in the sub-scanning section. Note that the fθ lens system 13 also operates as part of the incidence optical system 11. The surface to be scanned is the surface of a photosensitive drum.

With the embodiment having the above described configuration, the light beam optically modulated and emitted from the semiconductor laser 1 is transformed into a slightly divergent light beam by the condenser lens 2 and then enters the cylindrical lens 3 of the incidence system. The slightly divergent light beam entering the cylindrical 3 is converged by it in the sub-scanning section, limited by the aperture stop 4 and transmitted through the first cylindrical lens 6 and the spherical lens 7 by way of the fold mirror 5 before striking the deflection plane 8a of the optical deflector 8 to become focussed and form a substantially linear image (extending in the main-scanning direction) near the deflection plane 8a. Note that the light beam strikes the deflection plane 8a with an angle of 0.8° relative to the plane (plane of rotation of the optical deflector) perpendicular to the axis of rotation of the optical deflector 8 in the sub-scanning section that contains the axis of rotation of the optical deflector 8 and the optical axis of the focussing optical system 12. In short, the light beam from the incidence optical system 11 strikes the deflection plane 8a aslant in the sub-scanning section (oblique incidence optical system).

Meanwhile, the light beam is transmitted through the first cylindrical lens 6 and the spherical lens 7 without being modified (and hence maintaining the slightly divergent state) in the main-scanning section so that it is transformed into a substantially collimated light beam before striking the deflection plane 8a of the optical deflector 8 along the center line of the deflection angle (front incidence). Note that the substantially collimated light beam shows a width that is sufficiently broad relative to the facet width of the deflection plane 8a of the optical deflector 8 in the main-scanning direction (overfilled optical system).

The light beam deflected/reflected by the deflection plane 8a of the optical deflector 8 is then led to the surface of the photosensitive drum 10 by way of the spherical lens 7, the first cylindrical lens 6 and the second cylindrical lens 9 to scan the surface of the photosensitive drum 10 in the sense of arrow B (in the main-scanning direction) as the optical deflector 8 is driven to rotate in the sense of arrow A. As a result, an image is recorded on the surface of the photosensitive drum 10 operating as recording medium.

Figure 13:
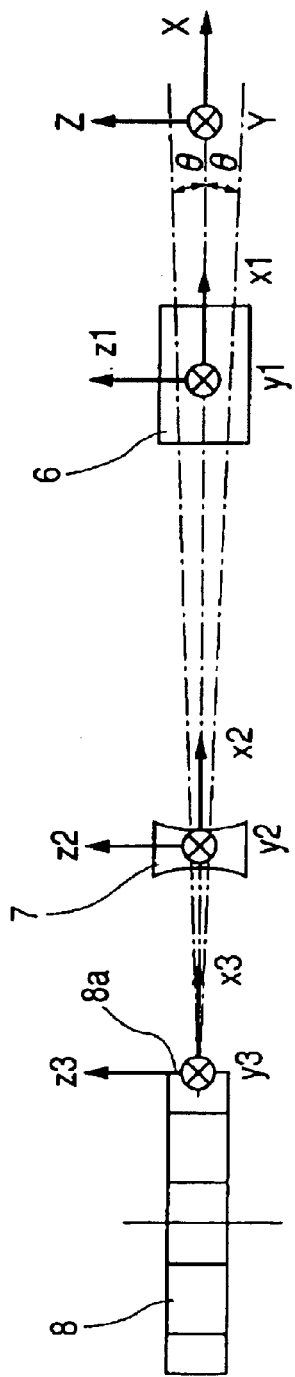
FIG. 13 is a schematic cross sectional view of a principal portion of Embodiment 4 of the present invention taken along the sub-scanning section.

FIG. 13 is a schematic cross sectional view of a principal portion of Embodiment 4 of the present invention taken along the sub-scanning section. In FIG. 13, the elements same as those of FIG. 1 are denoted respectively by the same reference symbols.

Referring to FIG. 13, if the unit vector running along the optical axis of the first cylindrical lens is expressed by x1 and the unit vector running along the optical axis of the spherical lens 7 is expressed by x2, while the normal vector of the deflection plane 8a at image height=0 is expressed by x3, x1, x2 and x3 are arranged to run in parallel with each other in the sub-scanning section. In other words, the perpendicular of the deflection plane 8a at image height=0, the optical axis of the spherical lens 7 and that of the first cylindrical lens 6 run in parallel with each other in the sub-scanning section and found on a same plane. With this arrangement, the scanner box of this embodiment can be prepared with ease and with an enhanced level of precision.

As pointed out above, the light beam emitted from the light source 1 of this embodiment strikes the deflection plane 8a with an angle of θ=0.8° relative to the plane (plane of rotation of the optical deflector) perpendicular to the axis of rotation of the optical deflector 8 in the sub-scanning section (oblique incidence optical system).

Figure 14:
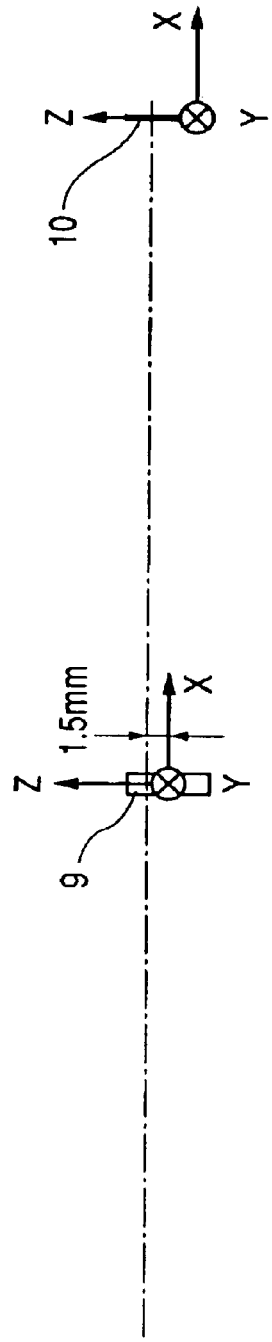
FIG. 14 is a schematic cross sectional view of a principal portion of Embodiment 4 of the present invention taken along the sub-scanning section.

FIG. 14 is a schematic cross sectional view of a principal portion of Embodiment 4 of the present invention taken along the sub-scanning section, showing the arrangement of the second cylindrical lens 9.

Referring to FIG. 14, the optical axis of the second cylindrical lens 9 is arranged in parallel with the optical axis of the first cylindrical lens 6 and the spherical lens 7. In other words, the direction vector at image height=0 of the light beam reflected by the deflection plane is arranged to show an angle of θ=0.8° relative to the optical axis of the second cylindrical lens 9. On the other hand, the light beam entering the second cylindrical lens 9 at image height=0 is arranged to pass 1.5 mm above the optical axis of the second cylindrical lens 9. With this arrangement, the curvature of the scanning line on the surface to be scanned 10 that is specific to the oblique incidence optical system and the coma in the sub-scanning direction are satisfactorily corrected in this embodiment.

Figure 15:
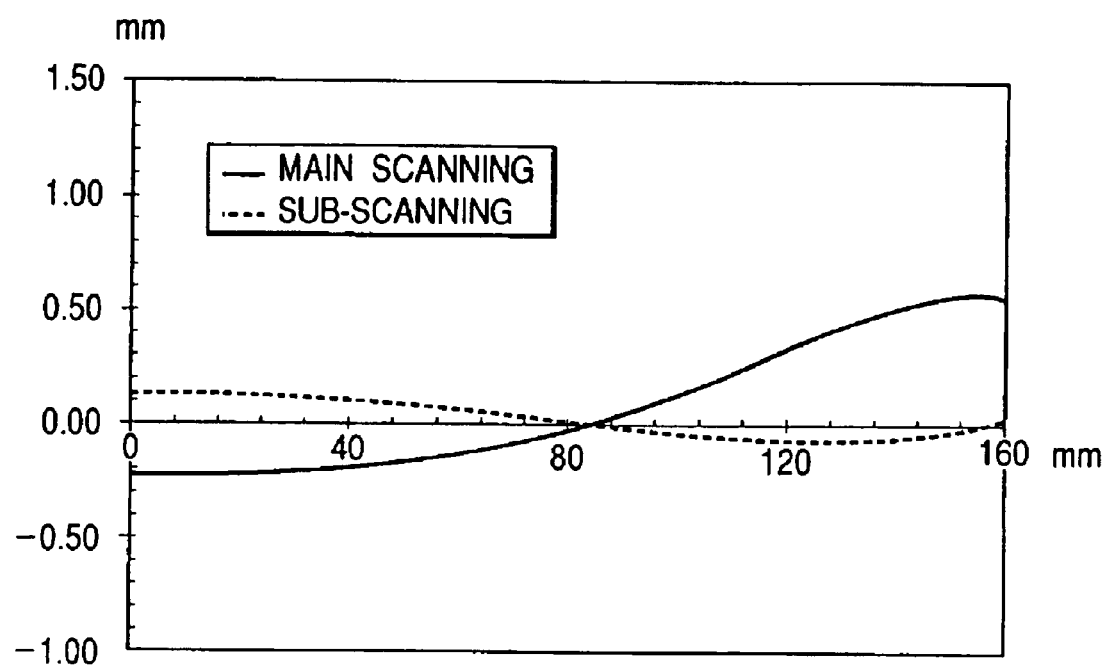
FIG. 15 is a graph showing the field curvature of Embodiment 4 in the main-scanning direction and in the sub-scanning direction.
Figure 16:
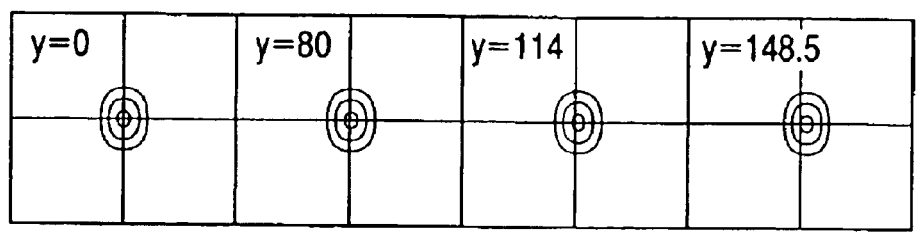
FIG. 16 is a graph showing the spot profile of Embodiment 4 of the present invention.
Figure 16:
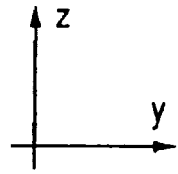
Figure 17:
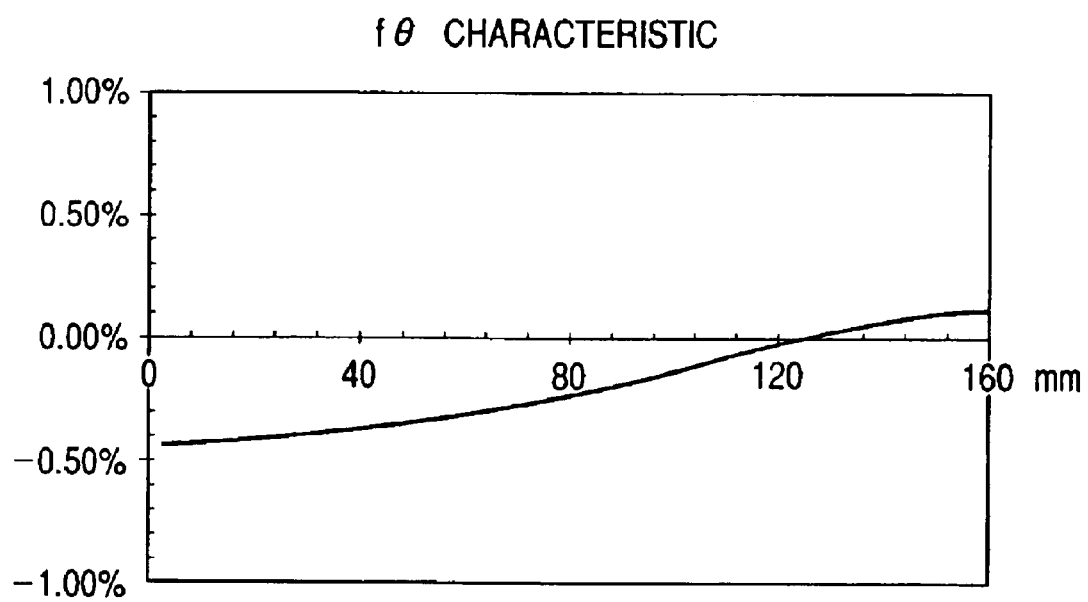
FIG. 17 is a graph showing the fθ characteristic of Embodiment 4 of the present invention.

FIG. 15 is a graph showing the field curvature of Embodiment 4 in the main-scanning direction and in the sub-scanning direction. FIG. 16 is a graph showing the spot profiles of Embodiment 4 of the present invention at different image heights. It will be appreciated that the contour lines of the spot profiles of FIG. 16 represent 13.5%, 40% and 80% respectively relative to the normalized peak, while the spot diameters are about 45 μm in the main-scanning direction (y-direction) and about 65 μm in the sub-scanning direction (z-direction). FIG. 17 is a graph showing the fθ characteristic of Embodiment 4 that varies as a function of the image height.

As shown in FIGS. 15, 16 and 17, the field curvature of this embodiment is corrected satisfactorily both in the main-scanning direction and in the sub-scanning direction, while both the spot profile and the fθ characteristic are also satisfactory.

In this way, the curvature of the scanning line on the surface to be scanned 10 that is specific to the oblique incidence optical system and the coma in the sub-scanning direction are satisfactorily corrected with this embodiment having the above described simple configuration mainly because the elements of the light-scanning optical apparatus are arranged optimally. Additionally, the problem as pointed out above that the part of the incident light beam trying to enter the optical system but reflected by the surface thereof gets to the surface to be scanned and adversely affect the image quality is dissolved by using the spherical lens 7 as lens facing the optical deflector 8 for the fθ lens system 13.

Now, Example 4 of set of numerical values that can be used for this embodiment will be shown below.

Note that the following symbols are used in the following example.

N1: the refractive index of the material of the spherical lens 7 at the operating wavelength, N2: the refractive index of the material of the first cylindrical lens 6 at the operating wavelength, D0: the distance between the deflection plane 8a of the optical deflector 8 and the spherical lens 7, D1: the thickness of the spherical lens 7, D2: the distance between the spherical lens 7 and the first cylindrical lens 6, D3: the thickness of the first cylindrical lens 6.

D4: the distance between the first cylindrical lens 6 and the second cylindrical lens 9, D5: the thickness of the second cylindrical lens 9, D6: the distance between the second cylindrical lens 9 and the surface to be scanned 10, R1: the radius of curvature of the surface of the spherical lens 7 facing the optical deflector 8, R2: the radius of curvature of the surface of the spherical lens 7 facing the surface to be scanned 10, R3: the radius of curvature of the surface of the first cylindrical lens 6 facing the optical deflector 8 as viewed in the main-scanning direction, R4: the radius of curvature of the surface of the first cylindrical lens 6 facing the surface to be scanned 10 as viewed in the main-scanning direction, r3: the radius of curvature of the surface of the second cylindrical lens 9 facing the optical deflector 8 as viewed in the sub-scanning direction, rd3: the aspherical coefficient of the surface of the second cylindrical lens 9 facing the optical deflector 8 as viewed in the sub-scanning direction, r4: the radius of curvature of the surface of the second cylindrical lens 9 facing the surface to be scanned 10 as viewed in the sub-scanning direction, rd4: the aspherical coefficient of the surface of the second cylindrical lens 9 facing the surface to be scanned 10 as viewed in the sub-scanning direction, where the radius of curvature r' for the distance y from the longitudinal axis on the surface of the second cylindrical lens 9 as viewed in the sub-scanning direction being expressed by $$r3' = r3 \cdot (1 + rd3 \cdot y^2) \text{ and}$$

$$r4' = r4 \cdot (1 + rd4 \cdot y^2), \text{ and}$$

r5: the radius of curvature of the surfaces of the second cylindrical lens 9 facing the optical deflector 8 and facing the surface to be scanned 10 as viewed in the main-scanning direction.

EXAMPLE 4

Set of Numerical Values
Operating Wavelength=655 nm

| N1 = 1.51389 | R1 = −263.3 |
| N2 = 1.6667 | R2 = 2098.45606 |
| D0 = 25 | R3 = ∞ |
| D1 = 4 | R4 = −145.5 |
| D2 = 41.45 | r3 = 114.1 |
| D3 = 15 | rd3 = 6.634 × 10⁻⁶ |
| D4 = 214 | r4 = −109.8 |
| D5 = 4 | rd4 = 7.914 × 10⁻⁶ |
| D6 = 168 | r5 = −1000 |

[Embodiment 5]

Figure 18:
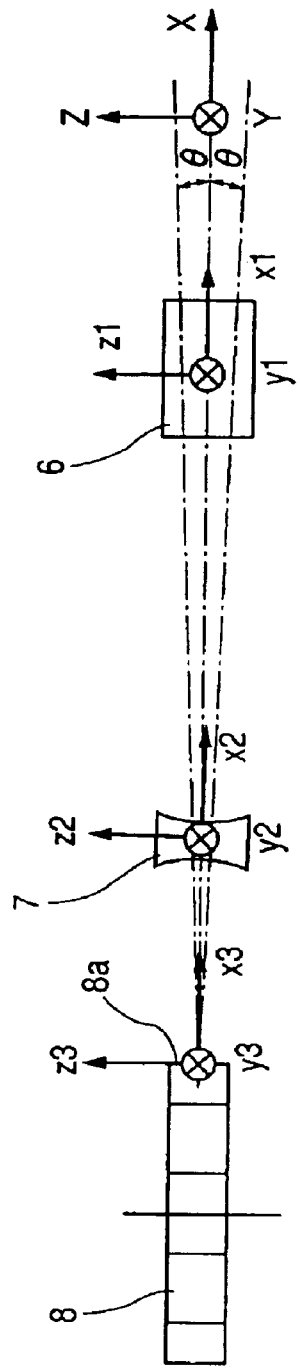
FIG. 18 is a schematic cross sectional view of a principal portion of Embodiment 5 of the present invention taken along the sub-scanning section.

FIG. 18 is a schematic cross sectional view of a principal portion of Embodiment 5 of the present invention from the first cylindrical lens to the optical deflector taken along the sub-scanning section. In FIG. 18, the elements same as those of FIG. 13 are denoted respectively by the same reference symbols.

This embodiment differs from the above described Embodiment 4 in that the perpendicular to the deflection plane 8a at image height=0 and the optical axis of the first cylindrical lens 6 are arranged in parallel with each other in the sub-scanning section and the elements are arranged so as to satisfy the requirement of conditional formula (A), which will be described hereinafter. Otherwise, this embodiment is identical with Embodiment 4 particularly in terms of configuration and optical effect.

As pointed out above, the perpendicular to the deflection plane 8a at image height=0 and the optical axis of the first cylindrical lens 6 are arranged in parallel with each other in the sub-scanning section and, if the direction vector of the light beam entering the deflection plane 8a at image height=0 and the direction vector of the light beam reflected by the deflection plane 8a are expressed respectively by α1 and α2 and the direction vector of the optical axis of the spherical-lens 7 is expressed by β, the related elements are arranged so as to satisfy the requirement of conditional formula (A) below.

$$|\alpha 1 \cdot \beta| > |\alpha 2 \cdot \beta| \quad (A)$$

The conditional formula (A) is so devised that the part of the light beam trying to enter the spherical lens 7 but reflected by the surface thereof is prevented from getting to the surface to be scanned by making the spherical lens 7 show an eccentric profile. Thus, if the requirement of conditional formula (A) is not met, some of the part of the light beam trying to enter the spherical lens 7 but reflected by the surface thereof gets to the surface to be scanned and adversely affect the image quality.

Thus, the spherical lens 7 is made to show an eccentric profile in this embodiment, this embodiment is more effective than Embodiment 4 for dissolving the adverse effect of the light beam reflected by the surface of the spherical lens 7. Additionally, the effect of eccentricity is greater when the spherical lens 7 is made to show an eccentric profile than when the first cylindrical lens 6 is made so. Still additionally, the influence of tilting the spherical lens 7 on the aberration is slight and the influence on the spot profile is negligible.

In this embodiment, the angle θ of incidence of the light beam striking the deflection plane 8a of the optical deflector 8 is θ=0.8°, while the angle θa between the perpendicular to the deflection plane 8a at image height=0 and the optical axis of the spherical lens 7 is θa=0.5°.

Thus, the parameters of conditional formula (A) take the following values.

α1=(−0.9999025, 0.0139622, 0.0000000)
α2=(0.9999025, 0.0139622, 0.0000000)
β=(0.9999619, −0.0087265, 0.0000000)
|α1·β|=0.999986292
|α2·β|=0.999742609
∴ |α1·β|>|α2·β|

[Embodiment 6]

Figure 19:
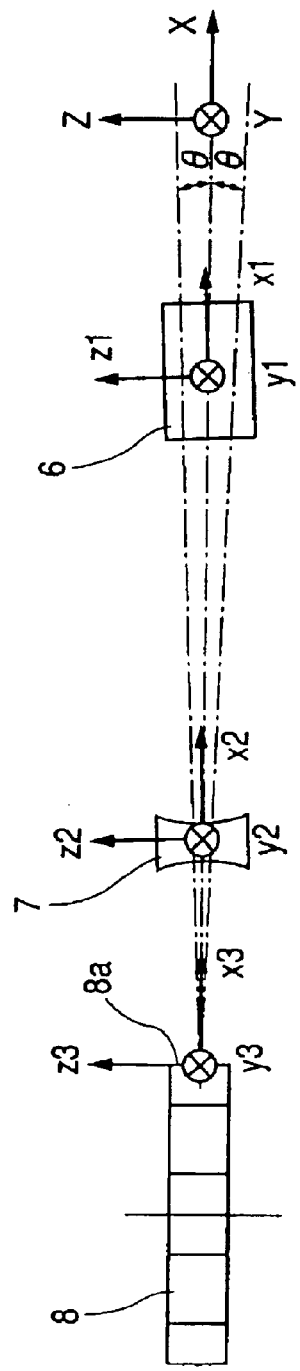
FIG. 19 is a schematic cross sectional view of a principal portion of Embodiment 6 of the present invention taken along the sub-scanning section.

FIG. 19 is a schematic cross sectional view of a principal portion of Embodiment 6 of the present invention taken along the sub-scanning section. In FIG. 19, the elements same as those of FIG. 13 are denoted respectively by the same reference symbols.

This embodiment differs from the above described Embodiment 4 in that the light beam reflected by the deflection plane 8a at image height=0, the optical axis of the spherical lens 7 and the optical axis of the first cylindrical lens 6 are arranged in parallel with each other in the sub-scanning section. Otherwise, this embodiment is identical with Embodiment 4 particularly in terms of configuration and optical effect.

Thus, in this embodiment, the light beam reflected by the deflection plane 8a at image height-0, the optical axis of the spherical lens 7 and the optical axis of the first cylindrical lens 6 are arranged in parallel with each other in the sub-scanning section and the exit F-number is made as small as about 40 in order to reduce the size of the light spot on the surface to be scanned.

With this arrangement, aberration is corrected effectively in the sub-scanning direction and in the direction of 45° and the curvature of scanning lines is reduced in this embodiment.

In this way, a high definition light-scanning optical apparatus using the oblique incidence optical system is realized by employing a simple configuration without exerting any adverse effect on the image quality mainly because the elements of the light-scanning optical apparatus are arranged optimally.

What is claimed is:

1. A light-scanning optical apparatus comprising:

an optical deflector;

an incidence optical system adapted to cause a light beam emitted from a light source to strike a deflection plane of said optical deflector with a predetermined angle in a sub-scanning section; and a focusing optical system for focusing the light beam reflected by the deflection plane of the optical deflector on a surface to be scanned, wherein said focusing optical system includes an first optical system having a spherical lens and a first cylindrical lens showing power in the main-scanning direction and a second optical system showing power in the sub-scanning direction, wherein said focusing optical system satisfies the requirements of conditional formulas (1) and (2)

$$\left| \frac{(N1-1)}{R2} \cdot F \right| < 0.15 \text{ and} \quad (1)$$

$$\left| \frac{(N2-1)}{R3} \cdot F \right| < 0.15; \text{ and} \quad (2)$$

wherein F is the focal length of the first optical system in the main-scanning direction, R2 is the radius of curvature of the surface of the spherical lens facing the surface to be scanned, R3 is the radius of curvature of the surface of the first cylindrical lens facing the optical deflector as viewed in the main-scanning direction, N1 is the refractive index of the material of the spherical lens at the operating wavelength, and N2 is the refractive index of the material of the first cylindrical lens at the operating wavelength.

2. A light-scanning optical apparatus according to claim 1, wherein the requirement of conditional formula (3) is satisfied:

$$0.86 < N1/N2 < 0.92 \quad (3).$$

3. A light scanning optical apparatus according to claim 1, wherein the requirement of conditional formula (4) is satisfied:

$$0.05 < D0/F < 0.08, \text{ and} \quad (4),$$

wherein D0 is the distance between the deflection plane of the optical deflector and the spherical lens.

4. A light-scanning optical apparatus according to claim 1, wherein the requirement of conditional formula (5) is satisfied:

$$0.15 < \frac{(D1/N1 + D2 + D3/N2)}{F} < 0.20, \text{ and,} \quad (5)$$

wherein D1 is the thickness of the spherical lens, D2 is the distance between the spherical lens and the first cylindrical lens, and D3 is the thickness of the first cylindrical lens.

5. A light-scanning optical apparatus according to claim 1, wherein:
said focusing optical system showing power in the sub-scanning direction has a second cylindrical lens; and
the light beam is made to pass through a position off the optical axis of the second cylindrical lens in the sub-scanning section when the image height is equal to zero (0).

6. A light-scanning optical apparatus according to claim 5, wherein a direction vector of the light beam reflected by the deflection plane at image height=0 and the optical axis of the second cylindrical lens are made to show a predetermined angle.

7. A light-scanning optical apparatus according to claim 5, wherein the perpendicular to the deflection plane at image height=0, the optical axis of the spherical lens and that of the first cylindrical lens are parallel with each other in the sub-scanning section.

8. A light-scanning optical apparatus according to claim 5, wherein:
the perpendicular to the deflection plane at image height=0 and the optical axis of the first cylindrical lens are parallel with each other in the sub-scanning section; and
if a direction vector of the light beam entering the deflection plane at image height=0 and a direction vector of the light beam reflected by the deflection plane are expressed respectively by α1 and α2 and a direction vector of the optical axis of the spherical lens is expressed by β, the requirement of the following conditional formula is satisfied, $$|\alpha 1 \cdot \beta| > |\alpha 2 \cdot \beta|.$$

9. A light-scanning optical apparatus according to claim 5, wherein the light beam reflected by the deflection plane at image height=0, the optical axis of the spherical lens and that of the first cylindrical lens are parallel with each other in the sub-scanning section.

10. A light-scanning optical apparatus according to claim 5, wherein the light beam emitted from the light source strikes the deflection plane of the optical deflector with a width broader than that of the deflection plane in the main-scanning direction.

11. A light-scanning optical apparatus according to claim 5, wherein the light beam emitted from the light source strikes the deflection plane of the optical deflector substantially along the center line of the deflection angle of the optical deflector.

12. A light-scanning optical apparatus according to claim 1, wherein the left side of the conditional formula (1) and the left side of the conditional formula (2) satisfy the requirement $$\left| \frac{(N1-1)}{R2} \cdot F \right| < \left| \frac{(N2-1)}{R3} \cdot F \right|.$$

13. A light-scanning optical apparatus according to claim 1, wherein the light beam emitted from the light source strikes the deflection plane of the optical deflector with a width broader than that of the deflection plane in the main-scanning direction.

14. A light-scanning optical apparatus according to claim 1, wherein the spherical lens and the first cylindrical lens also constitute part of said incidence optical system.

15. A light-scanning optical apparatus according to claim 1, wherein the light beam emitted from the light source strikes the deflection plane of the optical deflector substantially along the center line of the deflection angle of the optical deflector.

16. A light-scanning optical apparatus according to claim 1, wherein said focusing optical system showing power in the sub-scanning direction has a second cylindrical lens showing power in the sub-scanning direction.

17. A light-scanning optical apparatus comprising:
an optical deflector;
an incidence optical system adapted to cause a light beam emitted from a light source to strike a deflection plane of the optical deflector with a predetermined angle in a sub-scanning section; and
a focusing optical system for focusing the light beam reflected by the deflection plane of the optical deflector on a surface to be scanned,
wherein said focusing optical system includes an first optical system having a first lens showing power in the main scanning direction and a second lens showing power in the main scanning direction and a second optical system showing power in the sub-scanning direction,
wherein said focusing optical system satisfies the requirements of conditional formulas $$\left| \frac{(N1-1)}{R2} \cdot F \right| < 0.15,$$

$$\left| \frac{(N2-1)}{R3} \cdot F \right| < 0.15,$$

-continued $$\left|\frac{(N2-1)}{R3}\cdot F\right| < \left|\frac{N1-1}{R2}\cdot F\right|, \text{ and}$$

wherein F is the focal length of the first optical system in the main-scanning direction, R2 is the radius of curvature in the main scanning direction of the surface of the first lens facing the surface to be scanned, R3 is the radius of curvature of the surface in the main scanning direction of the surface of the second lens facing said optical deflector as viewed in the main-scanning direction, N1 is the refractive index of the material of the first lens at the operating wavelength, and N2 is the refractive index of the material of the second lens at the operating wavelength.

18. A light-scanning optical apparatus according to claim 17, wherein the light beam emitted from the light source strikes the deflection plane of the optical deflector with a width broader than that of the deflection plane in the main-scanning direction.

19. A light-scanning optical apparatus according to claim 17, wherein the first lens and the second lens also constitute part of said incidence optical system.

20. A light-scanning optical apparatus according to claim 17, wherein the light beam emitted from the light source strikes the deflection plane of the optical deflector substantially along the center line of the deflection angle of the optical deflector.

21. A light-scanning optical apparatus according to claim 17, wherein said second optical system showing power in the sub-scanning direction has a cylindrical lens showing power in the sub-scanning direction.

22. A light-scanning optical apparatus according to claim 17, wherein said apparatus satisfies the requirement of conditional formula $$0.86 < N1/N2 < 0.92.$$

23. A light-scanning optical apparatus according to claim 17, wherein said apparatus satisfies the requirement of conditional formula $$0.05 < D0/F < 0.08, \text{ and}$$

wherein D0 is the distance between the deflection plane of the optical deflector and the first lens.

24. A light-scanning optical apparatus according to claim 17, wherein the first lens comprises a spherical lens and the second lens comprises a cylindrical lens; and wherein the requirement of the following conditional formula is satisfied $$0.15 < \frac{(D1/N1 + D2 + D3/N2)}{F} < 0.20, \text{ and}$$

wherein D1 is the thickness of the spherical lens, D2 is the distance between the spherical lens and the cylindrical lens, and D3 is the thickness of the cylindrical lens.

25. A light-scanning optical apparatus according to claim 17, wherein:
said focusing optical system showing power in the sub-scanning direction has a cylindrical lens; and
the light beam at image height=0 is made to pass through a position off the optical axis of the cylindrical lens in the sub-scanning section.

26. A light-scanning optical apparatus according to claim 25, wherein a direction vector of the light beam reflected by the deflection plane at image height=0 and the optical axis of the cylindrical lens are made to show a predetermined angle.

27. A light-scanning optical apparatus according to claim 25, wherein the perpendicular to the deflection plane at image height=0, the optical axis of the first lens and that of the second lens are parallel with each other in the sub-scanning section.

28. A light-scanning optical apparatus according to claim 25, wherein:
the perpendicular to the deflection plane at image height=0 and the optical axis of the second lens are parallel with each other in the sub-scanning section; and
if a direction vector of the light beam entering the deflection plane at image height=0 and a direction vector of the light beam reflected by the deflection plane are expressed respectively by $\alpha 1$ and $\alpha 2$ and a direction vector of the optical axis of the first lens is expressed by $\beta$, requirement of the following conditional formula is satisfied $$|\alpha 1 \cdot \beta| > |\alpha 2 \cdot \beta|.$$

29. A light-scanning optical apparatus according to claim 25, wherein the light beam reflected by the deflection plane at image height=0, the optical axis of the first lens and that of the second lens are parallel with each other in the sub-scanning section.

30. An image forming apparatus comprising:
an optical deflector;
an incidence optical system adapted to cause a light beam emitted from a light to strike a deflection plane of said optical deflector with a predetermined angle in a sub-scanning section; and
a focusing optical system for focusing the light beam reflected by the deflection plane of the optical deflector on a surface to be scanned,
wherein said focusing optical system includes an first optical system having a spherical lens and a first cylindrical lens showing power in the main-scanning direction and a second optical system showing power in the sub-scanning direction,
wherein said focusing optical system satisfies the requirements of conditional formulas (1) and (2)

$$\left|\frac{(N1-1)}{R2}\cdot F\right| < 0.15 \quad (1)$$

and $$\left|\frac{(N2-1)}{R3}\cdot F\right| < 0.15, \text{ and} \quad (2)$$

wherein F is the focal length of the first optical system in the main-scanning direction, R2 is the radius of curvature of the surface of the spherical lens facing the surface to be scanned, R3 is the radius of curvature of the surface of the first cylindrical lens facing the optical deflector as viewed in the main-scanning direction, N1 is the refractive index of the material of the spherical lens at the operating wavelength, and N2 is the refractive index of the material of the first cylindrical lens at the operating wavelength.

31. An image forming apparatus according to claim 30, further comprising:
- a photosensitive member defining at least in part the surface to be scanned whereby the light beam focused on said photosensitive member by said focusing optical system creates an electrostatic latent image;
- a developing unit for developing the electrostatic latent image formed on said photosensitive member into a toner image;
- a transfer unit for transferring the developed toner image onto a toner image receiving member; and
- a fixing unit for fixing the transferred toner image on the toner image receiving member.

32. An image forming apparatus according to claim 30, further comprising a printer controller for transforming code data input from an external device into an image signal and inputting the image signal into said light-scanning optical apparatus.

33. An image forming apparatus comprising:
- an optical deflector;
- an incidence optical system adapted to cause a light beam emitted from a light source to strike a deflection plane of the optical deflector with a predetermined angle in a sub-scanning section; and
- a focusing optical system for focusing the light beam reflected by the deflection plane of the optical deflector on a surface to be scanned, wherein said focusing optical system includes an first optical system having a first lens showing power in the main scanning direction and a second lens showing power in the main scanning direction and a second optical system showing power in the sub-scanning direction;

wherein said focusing optical system satisfies the requirements of conditional formulas $$\left|\frac{(N1-1)}{R2} \cdot F\right| < 0.15,$$

$$\left|\frac{(N2-1)}{R3} \cdot F\right| < 0.15,$$

$$\left|\frac{(N2-1)}{R3} \cdot F\right| < \left|\frac{N1-1}{R2} \cdot F\right|, \text{ and}$$

wherein F is the focal length of the first optical system in the main-scanning direction, R2 is the radius of curvature in the main scanning direction of the surface of the first lens facing the surface to be scanned, R3 is the radius of curvature of the surface in the main-scanning direction of the surface of the second lens facing said optical deflector as viewed in the main-scanning direction, N1 is the refractive index of the material of the first lens at the operating wavelength, and N2 is the refractive index of the material of the second lens at the operating wavelength.

34. An image forming apparatus according to claim 33, further comprising:
- a photosensitive member arranged on the surface to be scanned;
- a developing unit for developing an electrostatic latent image formed on said photosensitive member by a light beam focused on said photosensitive member by said focusing optical system into a toner image;
- a transfer unit for transferring the developed toner image onto a toner image receiving member; and
- a fixing unit for fixing the transferred toner image on the toner image receiving member.

35. An image forming apparatus according to claim 33, further comprising a printer controller for transforming code data input from an external device into an image signal and inputting the image signal into said light-scanning optical apparatus.

* * * * *

UNITED STATES PATENT AND TRADEMARK OFFICE
CERTIFICATE OF CORRECTION

PATENT NO.    : 6,927,883 B1
DATED         : August 9, 2005
INVENTOR(S)   : Makoto Fujimoto It is certified that error appears in the above-identified patent and that said Letters Patent is hereby corrected as shown below:

Column 2,
Line 4, "sense" should read -- direction --;
Line 15, "plane" should read -- planes --; and
Line 65, "dissolved" should read -- resolved --.

Column 3,
Line 2, "to make" should read -- which makes --; and
Line 37, "said-first" should read -- said first --.

Column 4,
Line 13, "a" should read -- ¶    a --.

Column 5,
Lines 44, 47, 59 and 62, "cross sectional" should read -- cross-sectional --.

Column 6,
Line 40, "sense" should read -- direction --;
Line 42, "so" should be deleted; and
Line 43, "shows" should read -- has -- and "whose-inscribed" should read -- whose inscribed --.

Column 7,
Line 15, "as" should read -- at --; and
Lines 27 and 29, "sense" should read -- direction --.

Column 8,
Line 33, "system" should read -- system. --.

Column 9,
Line 19, "and the," should read -- and the --; and
Line 33, "Invention" should read -- invention --.

Column 10,
Line 42, "cross sectional" should read -- cross-sectional --; and
Line 65, "fying" should read -- fy --.

Column 12,
Line 15, "where" should read -- ¶    r': --;
Line 16, "r" should be deleted;
Line 24, "optical," should read -- optical --;
Line 32, "on the basis of" should be deleted; and

UNITED STATES PATENT AND TRADEMARK OFFICE
CERTIFICATE OF CORRECTION

PATENT NO. : 6,927,883 B1
DATED : August 9, 2005
INVENTOR(S) : Makoto Fujimoto

It is certified that error appears in the above-identified patent and that said Letters Patent is hereby corrected as shown below:

Column 12 (cont'd),
Line 33, "unit of millimeter" should read -- in millimeters --.

Column 14,
Line 7, "sense" should read -- direction --;
Line 10, "shows" should read -- has --; and
Line 36, "cylindrical" should read -- cylindrical lens --.

Column 15,
Lines 6 and 30, "cross sectional" should read -- cross-sectional --.

Column 16,
Line 7, "affect" should read -- affects --;
Line 8, "dissolved" should read -- solved --;
Line 55, "where" should read -- ¶    r': --; and
Line 56, "r" should be deleted.

Column 17,
Line 17, "cross sectional" should read -- cross-sectional --;
Line 40, "spherical-lens" should read -- spherical lens --;
Line 53, "affect" should read -- affects --;
Line 56, "dissolving" should read -- solving --; and
Line 65, "ea" should read -- θa --.

Column 18,
Line 10, "cross sectional" should read -- cross-sectional --;
Line 24, "height-0," should read -- height = 0, --; and
Line 50, "an" should read -- a --.

Column 20,
Line 51, "an" should read -- a --.

Column 22,
Line 42, "an" should read -- a --.

UNITED STATES PATENT AND TRADEMARK OFFICE
CERTIFICATE OF CORRECTION

PATENT NO. : 6,927,883 B1
DATED : August 9, 2005
INVENTOR(S) : Makoto Fujimoto

It is certified that error appears in the above-identified patent and that said Letters Patent is hereby corrected as shown below:

Column 23,
Line 29, "an" should read -- a --.

Signed and Sealed this

Twenty-eighth Day of March, 2006

JON W. DUDAS
*Director of the United States Patent and Trademark Office*